(12) United States Patent
Kim et al.

(10) Patent No.: US 8,897,990 B2
(45) Date of Patent: Nov. 25, 2014

(54) ISG SYSTEM AND CONTROL METHOD THEREOF

(75) Inventors: Sejun Kim, Seoul (KR); Chongah Gwon, Hwaseong-si (KR); Jiyong Yu, Pocheon-si (KR); Junghwan Bang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 421 days.

(21) Appl. No.: 13/306,515

(22) Filed: Nov. 29, 2011

(65) Prior Publication Data
US 2012/0143468 A1    Jun. 7, 2012

(51) Int. Cl.
*F02D 45/00*    (2006.01)
*F02N 11/08*    (2006.01)

(52) U.S. Cl.
CPC ........ *F02N 11/0837* (2013.01); *F02N 11/0833* (2013.01); *F02N 2200/0802* (2013.01); *F02N 2200/12* (2013.01); *F02N 2200/123* (2013.01); *Y02T 10/48* (2013.01)
USPC ........................................ 701/102; 123/179.4

(58) Field of Classification Search
CPC ...... F02N 11/0855; F02D 29/02; F02D 45/00
USPC ............... 701/102, 110, 112–115; 123/179.1, 123/179.4, 179.12, 179.14, 179.16, 179.3, 123/198 D, 198 F
See application file for complete search history.

(56) References Cited

U.S. PATENT DOCUMENTS

| | | | |
|---|---|---|---|
| 3,859,627 A | | 1/1975 | Quantz |
| 4,312,310 A | * | 1/1982 | Chivilo' et al. ........ 123/198 DB |
| 6,445,982 B1 | | 9/2002 | Swales et al. |
| 7,082,914 B2 | * | 8/2006 | You ............................ 123/179.4 |
| 7,083,020 B2 | | 8/2006 | Morimoto et al. |
| 7,149,621 B2 | * | 12/2006 | Kishibata et al. ............. 701/110 |
| 7,882,420 B2 | | 2/2011 | Moore et al. |
| 8,370,051 B2 | * | 2/2013 | Pursifull et al. .............. 701/112 |
| 8,527,145 B2 | | 9/2013 | Yu et al. |
| 8,676,479 B2 | * | 3/2014 | Pursifull et al. .............. 701/112 |
| 2001/0013701 A1 | | 8/2001 | Onoyama et al. |
| 2002/0138182 A1 | | 9/2002 | Swales et al. |
| 2003/0135321 A1 | | 7/2003 | Kumazaki et al. |
| 2003/0197991 A1 | | 10/2003 | Kahlon et al. |
| 2005/0055152 A1 | * | 3/2005 | Wakashiro et al. ........... 701/110 |
| 2005/0139182 A1 | * | 6/2005 | You ............................ 123/179.4 |
| 2006/0011163 A1 | * | 1/2006 | Watanabe et al. .......... 123/179.4 |

(Continued)

FOREIGN PATENT DOCUMENTS

| | | |
|---|---|---|
| DE | 10211463 B3 | 1/2004 |
| EP | 1612408 A1 | 1/2006 |

(Continued)

*Primary Examiner* — John Kwon
*Assistant Examiner* — Johnny H Hoang
(74) *Attorney, Agent, or Firm* — Morgan, Lewis & Bockius LLP

(57) ABSTRACT

An ISG system may include a shift stage sensing unit that senses a shift stage of a transmission, a parking sensing unit that senses a driver's intension of parking by recognizing at least one of whether a vehicle enters a parking lot and whether a parking assistant system may be operated, and an ISG controller that stops an idle-stop of an engine when the shift stage of the shift stage sensing unit may be at a reverse stage or the parking sensing unit senses the driver's intension of parking.

8 Claims, 2 Drawing Sheets

(56) References Cited

U.S. PATENT DOCUMENTS

| | | | |
|---|---|---|---|
| 2006/0137651 A1* | 6/2006 | Kishibata et al. | 123/352 |
| 2006/0145536 A1 | 7/2006 | Hackl et al. | |
| 2006/0224279 A1 | 10/2006 | Mori | |
| 2006/0231074 A1* | 10/2006 | Ueno et al. | 123/399 |
| 2007/0199533 A1* | 8/2007 | Takahashi | 123/179.4 |
| 2007/0267238 A1 | 11/2007 | Guy et al. | |
| 2009/0271095 A1 | 10/2009 | Kojima | |
| 2009/0292455 A1 | 11/2009 | Abendroth et al. | |
| 2009/0312940 A1 | 12/2009 | Poudrier et al. | |
| 2010/0000487 A1* | 1/2010 | Hoshino et al. | 123/179.4 |
| 2010/0174477 A1* | 7/2010 | Ozaki et al. | 701/200 |
| 2010/0185390 A1* | 7/2010 | Monde et al. | 701/208 |
| 2010/0282200 A1 | 11/2010 | Notani et al. | |
| 2010/0286887 A1 | 11/2010 | Maruyama | |
| 2010/0312426 A1 | 12/2010 | Philipp et al. | |
| 2010/0332064 A1 | 12/2010 | Rieling et al. | |
| 2011/0160964 A1* | 6/2011 | Obradovich | 701/41 |
| 2011/0160985 A1* | 6/2011 | Yamaguchi | 701/112 |
| 2012/0143481 A1 | 6/2012 | Yu et al. | |

FOREIGN PATENT DOCUMENTS

| | | |
|---|---|---|
| EP | 2199595 A1 | 6/2010 |
| GB | 2451171 B | 9/2012 |
| JP | 2001-97071 A | 4/2001 |
| JP | 2002-257220 A | 9/2002 |
| JP | 2004-116389 A | 4/2004 |
| JP | 2004-143934 A | 5/2004 |
| JP | 2005-23837 A | 1/2005 |
| JP | 2007-146727 A | 6/2007 |
| JP | 2009-2236 A | 1/2009 |
| JP | 4530060 B2 | 6/2010 |

* cited by examiner

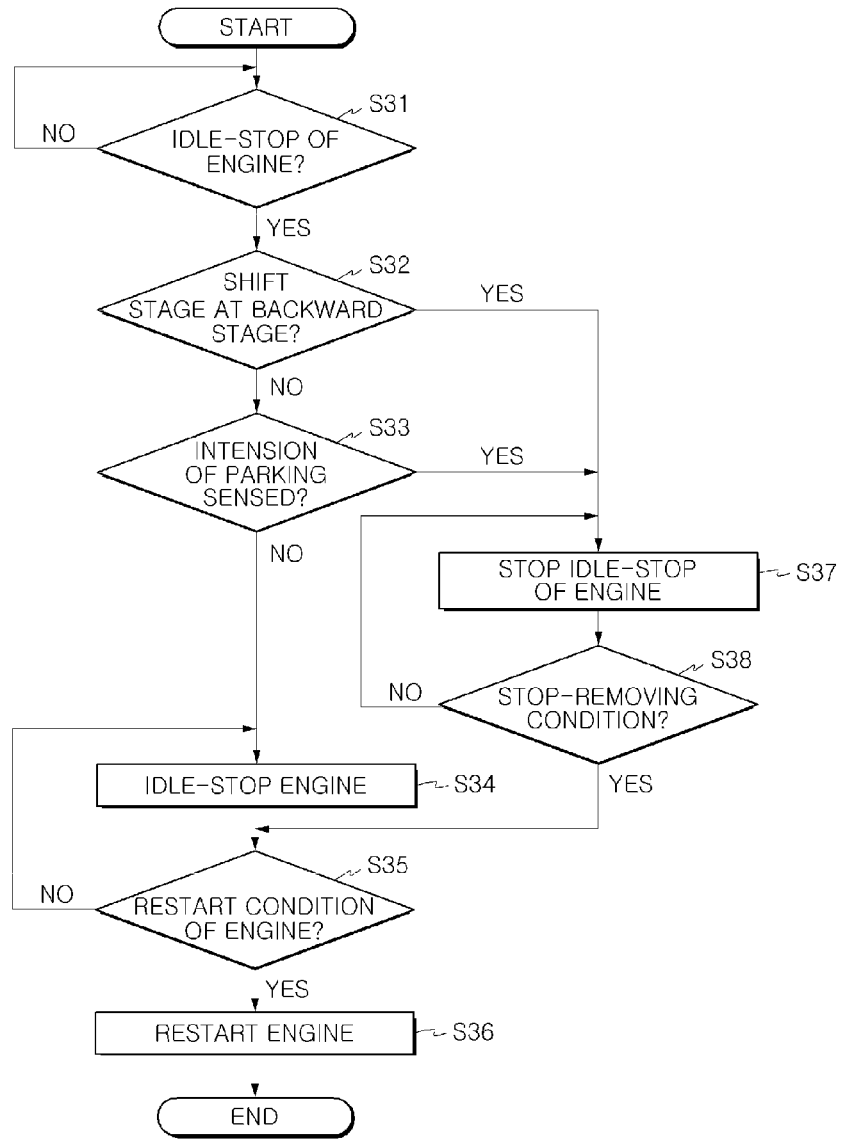

ISG SYSTEM AND CONTROL METHOD THEREOF

CROSS-REFERENCE TO RELATED APPLICATIONS

The present application claims priority to Korean Patent Application Number 10-2010-0121682 filed Dec. 1, 2010, the entire contents of which application is incorporated herein for all purposes by this reference.

BACKGROUND OF THE INVENTION

1. Field of the Invention

The present invention relates to an ISG vehicle equipped with an ISG (Idle Stop and Go) system, and particularly, to an ISG system that prevents idle-stop of an engine when a driver intends to park a vehicle, and a control method thereof.

2. Description of Related Art

Recently, technologies for improving fuel efficiency to reduce $CO_2$ have been developed in various ways, and the ISG system is a system that stops the engine when a vehicle stops and automatically starts the engine when the vehicle starts.

The ISG system allows normal traveling by automatically idle-stopping the engine under predetermined conditions while receiving information, such as the speed of the vehicle, the revolution speed of the engine, and the temperature of the cooling water, and then automatically restarting (Go) the engine when restart is required by the driver's intention and the conditions of the vehicle itself.

The condition for entering the idle-stop in the ISG system is a state with the engine sufficiently warmed up, that is, a stop state where the vehicle speed is not detected with the cooling water maintained at a predetermined temperature or more, and when a predetermined time passes after the brake pedal is operated, the engine is stopped to increase fuel efficiency and reduce emission.

Further, when the driver's intention of starting the vehicle, for example, operating the acceleration pedal, releasing the brake pedal, or operating the clutch pedal, with the engine idle-stopped, the engine is started for normal traveling. It is possible to achieve an effect of an increase in fuel efficiency of about 5 to 15% in the vehicle equipped with the ISG system.

In an ISG vehicle equipped with the ISG system, as shown in FIG. 1, when a vehicle repeatedly moves forward/backward at a low speed for parking, the ISG system is operated and repeats idle-stopping and restarting. In this case, the engine is repeatedly idle-stopped and restarted for a short time, such that the fuel efficiency is reduced, and the driver has difficulty in parking, and instability is caused by the stopping/restarting of the engine, such that safety is reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an ISG system that does not stop an engine even under an engine idle-stop condition by recognizing that a vehicle is being parked, and a control method of the ISG system.

In an aspect of the present invention, an ISG system may include a shift stage sensing unit that senses a shift stage of a transmission, a parking sensing unit that senses a driver's intension of parking by recognizing at least one of whether a vehicle enters a parking lot and whether a parking assistant system is operated, and an ISG controller that stops an idle-stop of an engine when the shift stage of the shift stage sensing unit is at a reverse stage or the parking sensing unit senses the driver's intension of parking.

The parking sensing unit recognizes whether the vehicle enters the parking lot by using at least any one of a GPS (Global Positioning System), a camera, and a parking lot signal receiver, which are mounted in the vehicle.

The parking sensing unit recognizes whether the parking assistant system is operated, by using a parking assistant sensor or a sensor that senses the operation of an automatic parking system.

The ISG controller stops the idle-stop of the engine for a predetermined time, for a predetermined traveling distance, or while the vehicle travels within a predetermined speed, after sensing the intention of parking.

In another aspect of the present invention, a control method of an ISG system, may include a first step of checking whether a shift stage is at a reverse stage, a second step of sensing a driver's intension of parking, a third step of stopping an idle-stop of an engine when the shift stage is at the reverse stage or the driver's intension of parking is sensed under an idle-stop condition of the engine, a fourth step of checking whether a stop-removing condition is satisfied after the third step, and a fifth step of idle-stopping or starting the engine, depending on that the idle-stop condition is satisfied or the restart condition is satisfied when the stop-removing condition is satisfied.

The second step recognizes whether a vehicle enters a parking lot or senses the driver's intension of parking, by using any one of a GPS (Global Positioning System), a camera, and a parking lot signal receiver, which are mounted in the vehicle.

The second step recognizes whether a parking assistant system is operated and senses the driver's intention of parking, by using a parking assistant sensor mounted in the vehicle or a sensor that senses the operation of an automatic parking system.

The fourth step checks whether the stop-removing condition is satisfied, by recognizing whether a predetermined time passes, whether the vehicle travels at a predetermined traveling distance, or whether the vehicle travels above a predetermined speed, after the driver's intension of parking is sensed.

According to exemplary embodiments of the present invention, since the engine keeps operating when the driver parks the vehicle, it is possible to prevent reduction of fuel efficiency due to frequent repetition of starting/stopping the engine and to improve safety by removing instability due to stopping of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operational flowchart showing a control method of an ISG system according to an exemplary embodiment of the present invention.

Figure 1:
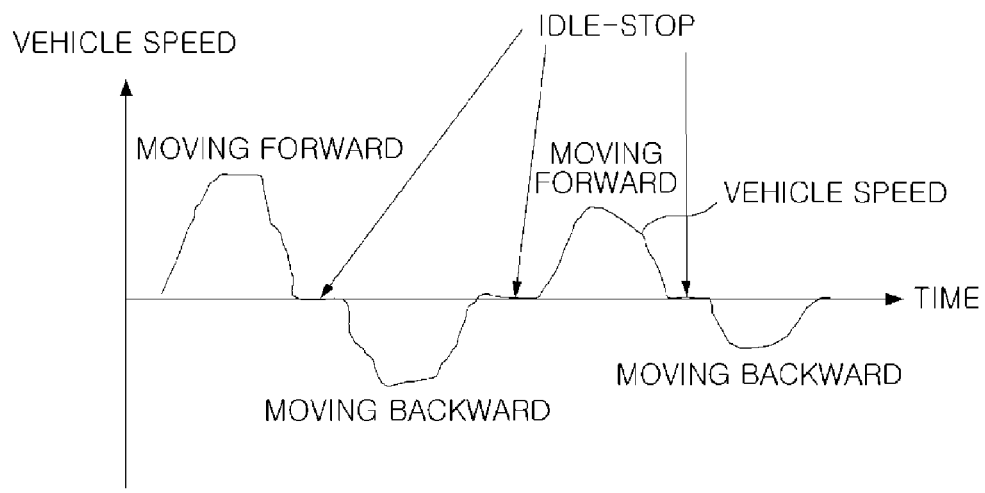
FIG. 1 is a view illustrating problems in parking of an ISG vehicle of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, an ISG system and a control method thereof according to an exemplary embodiment of the present invention are described in detail with reference to the accompanying drawings.

Figure 2:
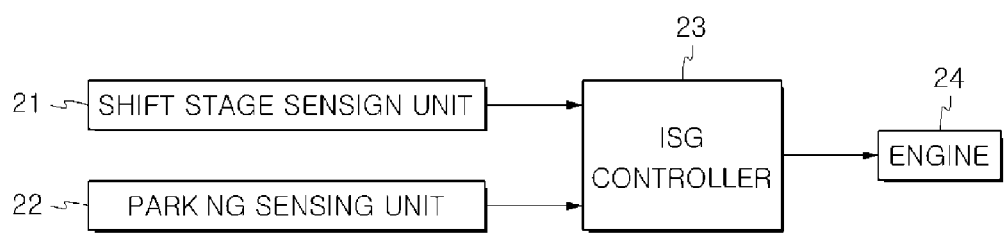
FIG. 2 is a block diagram showing the configuration of an ISG system according to an exemplary embodiment of the present invention.

FIG. 2 is a block diagram showing the configuration of an ISG system according to an exemplary embodiment of the present invention.

An ISG system according to an exemplary embodiment of the present invention includes a shift stage sensing unit 21 that senses the shift stages of a transmission, a parking sensing unit 22 that senses the driver's intension of parking by recognizing at least one of whether a vehicle enters a parking lot and whether a parking assistant system is operated, and an ISG controller 23 that stops idle-stop of an engine 24 when the shift stage of shift stage sensing unit 21 is at the reverse stage or parking sensing unit 22 senses the driver's intension of parking.

The method that parking sensing unit 22 recognizes whether the vehicle enters a parking lot includes a method of recognizing that a vehicle has entered the area of a parking lot by using a GPS (Global Positioning System) in the vehicle, a method of recognizing that a vehicle has entered the area of a parking lot by using a camera in the vehicle, and a method of recognizing that a vehicle has entered the area of a parking lot by receiving a predetermined signal from the parking lot.

The method that parking sensing unit 22 recognizes whether the parking assistant system is operated includes a method receiving operation sensing signal from a parking assistant sensor or sensors that sense the operation of an automatic parking system.

The method that ISG controller 23 stops idle-stop of an engine 24 when the driver's intention of parking is sensed includes a method of stopping the idle-stop of engine 24 for a predetermined time after ISG controller 23 senses the intention of parking, a method of stopping the idle-stop of engine 24 for a predetermined traveling distance after the intention of parking is sensed, and a method of stopping the idle-stop of engine 24 while the vehicle travels within a predetermined speed after the intension of parking is sensed. The ISG controller removes the stopping when a predetermined time passes after the intention of parking is sensed and the vehicle travels more than a predetermined traveling distance or at a predetermined speed or more.

When the idle-stop of the engine is stopped, the engine keeps operating even if an idle-stop condition of the engine of the vehicle is satisfied.

FIG. 3 is an operational flowchart showing a control method of an ISG system according to an exemplary embodiment of the present invention.

When the idle-stop condition of the engine is satisfied (S31), it is checked whether the shift stage is at the 'reverse stage' (S32) and it is sensed whether the driver intends to park (S33). When the shift stage is not at the reverse stage and the driver's intention of parking is not sensed, the engine is idle-stopped (S34), and then when a restart condition of an engine of the vehicle is satisfied (S35), the engine is restarted (S36).

Meanwhile, when the shift stage is at the reverse stage in step S32 or the driver's intension of parking is sensed in step S33, the idle-stop of the engine is stopped (S37). That is, the engine keeps operating without being idle-stopped, even though the idle-stop condition of the engine is satisfied. When a stop-removing condition is satisfied after step S37 (S38), the process proceeds to step S35 and determines whether the restart condition of the engine is satisfied, and then when the restart condition of the engine is not satisfied, the engine is idle-stopped (S34), or when the restart condition of the engine is satisfied, the engine is started (S36) and the process is finished.

The method of sensing the driver's intention of parking in step S33 senses the driver's intension of parking by recognizing at least one of whether the vehicle enters a parking lot or whether the parking assistant system is operated. The method that the parking sensing unit recognizes whether the vehicle enters a parking lot includes a method of recognizing that a vehicle has entered the area of a parking lot by using a GPS (Global Positioning System) in the vehicle, a method of recognizing that a vehicle has entered the area of a parking lot by using a camera in the vehicle, and a method of recognizing that a vehicle has entered the area of a parking lot by receiving a predetermined signal from the parking lot. The method that the parking sensing unit recognizes whether the parking assistant system is operated includes a method recognizing operation sensing signal from a parking assistant sensor or sensors that sense the operation of a parking system.

The method of stopping the idle-stop of the engine in step S37 includes a method of stopping the idle-stop of the engine for a predetermined time after the intention of parking is sensed, a method of stopping the idle-stop of the engine for a predetermined traveling distance after the intension of parking is sensed, and a method of stopping the idle-stop of the engine while the vehicle travels within a predetermined speed after the intension of parking is sensed. The stopping is removed when a predetermined time passes after the intention of parking is sensed and the vehicle travels more than a predetermined traveling distance or at a predetermined speed or more in step S38.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An ISG system, comprising:
   a shift stage sensing unit that senses a shift stage of a transmission;
   a parking sensing unit that senses a driver's intension of parking by recognizing at least one of whether a vehicle enters a parking lot and whether a parking assistant system is operated; and
   an ISG controller that stops an idle-stop of an engine when the shift stage of the shift stage sensing unit is at a reverse stage and the parking sensing unit senses the driver's intension of parking.

2. The ISG system as defined in claim 1, wherein the parking sensing unit recognizes whether the vehicle enters the parking lot by using at least any one of a GPS (Global Positioning System), a camera, and a parking lot signal receiver, which are mounted in the vehicle.

3. The ISG system as defined in claim 1, wherein the parking sensing unit recognizes whether the parking assistant system is operated, by using a parking assistant sensor or a sensor that senses the operation of an automatic parking system.

4. The ISG system as defined in claim 1, wherein the ISG controller stops the idle-stop of the engine for a predetermined time, for a predetermined traveling distance, or while the vehicle travels within a predetermined speed, after sensing the intention of parking.

5. A control method of an ISG system, comprising:
   a first step of checking whether a shift stage is at a reverse stage;
   a second step of sensing a driver's intension of parking;
   a third step of stopping an idle-stop of an engine when the shift stage is at the reverse stage and the driver's intension of parking is sensed under an idle-stop condition of the engine;
   a fourth step of checking whether a stop-removing condition is satisfied after the third step; and
   a fifth step of idle-stopping or starting the engine, depending on that the idle-stop condition is satisfied or the restart condition is satisfied when the stop-removing condition is satisfied.

6. The control method as defined in claim 5, wherein the second step recognizes whether a vehicle enters a parking lot or senses the driver's intension of parking, by using any one of a GPS (Global Positioning System), a camera, and a parking lot signal receiver, which are mounted in the vehicle.

7. The control method as defined in claim 5, wherein the second step recognizes whether a parking assistant system is operated and senses the driver's intention of parking, by using a parking assistant sensor mounted in the vehicle or a sensor that senses the operation of an automatic parking system.

8. The control method as defined in claim 5, wherein the fourth step checks whether the stop-removing condition is satisfied, by recognizing whether a predetermined time passes, whether the vehicle travels at a predetermined traveling distance, or whether the vehicle travels above a predetermined speed, after the driver's intension of parking is sensed.

\* \* \* \* \*